United States Patent
Miller et al.

(10) Patent No.: US 9,036,292 B2
(45) Date of Patent: May 19, 2015

(54) APPARATUS, SYSTEM, AND METHOD FOR OPTIMALLY POSITIONING AN IDLE ROBOTIC ACCESSOR IN A TAPE LIBRARY

(71) Applicant: International Business Machines Corporation, Armonk, NY (US)

(72) Inventors: Vernon W. Miller, Tucson, AZ (US); Shawn M. Nave, Tucson, AZ (US)

(73) Assignee: International Business Machines Corporation, Armonk, NY (US)

(*) Notice: Subject to any disclaimer, the term of this patent is extended or adjusted under 35 U.S.C. 154(b) by 0 days.

(21) Appl. No.: 13/899,455

(22) Filed: May 21, 2013

(65) Prior Publication Data

US 2014/0347764 A1    Nov. 27, 2014

(51) Int. Cl.
*G11B 5/008*    (2006.01)
*G11B 15/68*    (2006.01)

(52) U.S. Cl.
CPC ............ *G11B 15/689* (2013.01); *G11B 15/688* (2013.01); *G11B 5/008* (2013.01); *G11B 15/6835* (2013.01)

(58) Field of Classification Search
CPC ...... G11B 15/60; G11B 15/675; G11B 15/68; G11B 15/682; G11B 15/683; G11B 15/6835; G11B 15/688; G11B 15/689; G11B 5/008; G11B 5/78
USPC ................ 360/83, 69, 92.1, 93, 98.04, 98.05, 360/98.06, 99.06, 99.13, 72.3; 369/30.38, 369/30.42; 720/616
See application file for complete search history.

(56) References Cited

U.S. PATENT DOCUMENTS

| | | | |
|---|---|---|---|
| 5,757,738 A * | 5/1998 | Ohba et al. ................ | 369/30.32 |
| 6,115,648 A * | 9/2000 | Gallo ........................... | 700/218 |
| 6,184,643 B1 * | 2/2001 | Akiyama et al. ............. | 318/566 |
| 6,205,093 B1 * | 3/2001 | Abbott et al. ............. | 369/30.31 |
| 6,356,803 B1 | 3/2002 | Goodman et al. | |
| 6,483,655 B1 * | 11/2002 | Ojima ............................ | 360/69 |
| 6,512,963 B1 * | 1/2003 | Felde et al. ................... | 700/215 |
| 6,658,320 B2 * | 12/2003 | Goodman et al. ............ | 700/214 |
| 6,943,976 B2 | 9/2005 | Goodman et al. | |
| 7,079,978 B2 | 7/2006 | Goodman et al. | |
| 7,483,236 B2 | 1/2009 | McIntosh et al. | |
| 7,843,663 B2 * | 11/2010 | Nave et al. .................. | 360/92.1 |
| 8,265,786 B2 | 9/2012 | Jesionowski et al. | |
| 2005/0137742 A1 | 6/2005 | Goodman et al. | |
| 2005/0261850 A1 * | 11/2005 | Goodman et al. ............. | 702/85 |
| 2010/0287576 A1 * | 11/2010 | Terzis et al. .................. | 720/630 |

* cited by examiner

*Primary Examiner* — Thomas Alunkal
(74) *Attorney, Agent, or Firm* — Zilka-Kotab, PC

(57) ABSTRACT

In one embodiment, a system includes a robotic accessor for transporting media between multiple storage slots and one or more data storage drives; a controller for controlling the robotic accessor; a memory in communication with and/or integrated with the controller for storing information about the media and the storage slots, the information including data corresponding to a physical distribution of the media in the storage slots; and logic integrated with and/or executable by the controller, the logic being adapted to: position the robotic accessor at a computed optimal position during an idle period of the robotic accessor, the computed optimal position being based at least in part on the physical distribution of the media in the storage slots.

20 Claims, 10 Drawing Sheets

APPARATUS, SYSTEM, AND METHOD FOR OPTIMALLY POSITIONING AN IDLE ROBOTIC ACCESSOR IN A TAPE LIBRARY

BACKGROUND

The present invention relates to data storage systems, and more particularly, this invention relates to optimally positioning an idle robotic accessor in a tape library to minimize access time.

Automated data storage libraries are known for providing cost effective storage and retrieval of large quantities of data. The data in automated data storage libraries is typically stored on media of data storage cartridges that are, in turn, stored at storage slots or the like inside the library in a fashion that renders the media, and its resident data, accessible for physical retrieval. Such data storage cartridges are commonly termed "removable media." Data storage cartridge media may comprise any type of media on which data may be stored and which may serve as removable media, including but not limited to magnetic media (such as magnetic tape or disks), optical media (such as optical tape or disks), electronic media (such as PROM, EEPROM, flash PROM, CompactFlash™, Smartmedia™, Memory Stick™, etc.), or other suitable media. An example of a data storage cartridge that is widely employed in automated data storage libraries for mass data storage is a magnetic tape cartridge.

In addition to data storage media, automated data storage libraries typically comprise data storage drives that store data to, and/or retrieve data from, the data storage cartridge media. Further, automated data storage libraries typically comprise I/O stations at which data storage cartridges are supplied or added to, or removed from, the library. The transport of data storage cartridges between data storage slots, data storage drives, and I/O stations is typically accomplished by one or more accessors. Such accessors have grippers for physically retrieving the selected data storage cartridges from the storage slots within the automated data storage library and transporting such cartridges to the data storage drives by moving, for example, in the X and Y directions.

In an effort to increase storage capacity, deep slot technology allows for storage cells that contain more than a single data storage cartridge. Such storage libraries allow for higher density, or more cartridges stored per square foot. In 'deep slot' libraries, two or more cartridges may be stored in a multi-cartridge deep slot cell, arrayed in series, one behind the other, in tiers ranging from a frontmost tier to a rearmost tier.

In the near future, with the adoption of improved media, the cost of storing information (on a per byte basis) on tape is expected to decline by a factor of five or more with respect to magnetic disk. Also, short-term and long-term reliability will continue to favor tape-based storage. Furthermore, as more mass storage is allocated to cloud networks, most storage will be in large libraries, rather than on individual drives, which is a consideration favoring tape-based storage. One historical disadvantage of tape-based storage with respect to disk-based storage was the relatively poor access time associated with tape-based storage, with the time required to bring the tape to the tape drive and then spool the tape to the file location typically averaging about 40 seconds in some systems.

BRIEF SUMMARY

In one embodiment, a system includes a robotic accessor for transporting media between multiple storage slots and one or more data storage drives; a controller for controlling the robotic accessor; a memory in communication with and/or integrated with the controller for storing information about the media and the storage slots, the information including data corresponding to a physical distribution of the media in the storage slots, and logic integrated with and/or executable by the controller, the logic being adapted to: position the robotic accessor at a computed optimal position during an idle period of the robotic accessor, the computed optimal position being based at least in part on the physical distribution of the media in the storage slots.

In another embodiment, a method includes positioning a robotic accessor at a computed optimal position during an idle period of the robotic accessor, wherein the robotic accessor is adapted for transporting media between multiple storage slots and one or more data storage drives.

In yet another embodiment, a method includes determining an optimal position of a robotic accessor relative to a plurality of storage slots based on calculating a center of access using data corresponding to a physical distribution of media in the storage slots, wherein the storage slots are for storing the media therein, wherein the robotic accessor is adapted for transporting the media between the storage slots and one or more data storage drives.

Any of these embodiments may be implemented in a magnetic data storage system such as a tape drive system, which may include a magnetic head, a drive mechanism for passing a magnetic medium (e.g., recording tape) over the magnetic head, and a controller electrically coupled to the magnetic head.

Other aspects and embodiments of the present invention will become apparent from the following detailed description, which, when taken in conjunction with the drawings, illustrate by way of example the principles of the invention.

DETAILED DESCRIPTION

Figure 1:
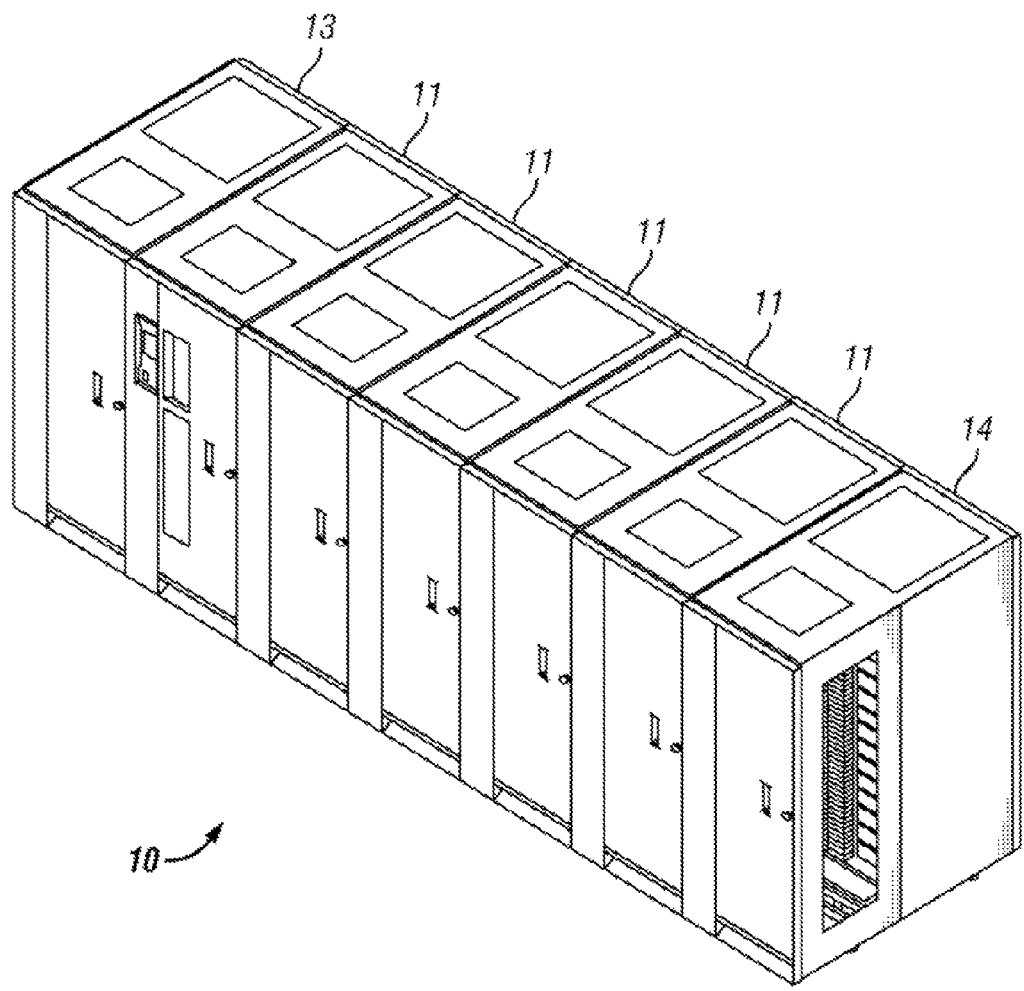
FIG. 1 is a perspective view of an automated data storage library according to one embodiment.

The following description is made for the purpose of illustrating the general principles of the present invention and is not meant to limit the inventive concepts claimed herein. Further, particular features described herein can be used in combination with other described features in each of the various possible combinations and permutations.

Unless otherwise specifically defined herein, all terms are to be given their broadest possible interpretation including meanings implied from the specification as well as meanings understood by those skilled in the art and/or as defined in dictionaries, treatises, etc.

It must also be noted that, as used in the specification and the appended claims, the singular forms "a," "an" and "the" include plural referents unless otherwise specified.

Furthermore it should be noted that the variable identifier "N" is used in several instances herein, to more simply designate the final element of a series of related or similar elements. The repeated use of such variable identifiers is not meant to imply a correlation between the sizes of such series of elements, although such correlation may exist. The use of such variable identifiers does not require that the series of elements has the same number of elements as another series delimited by the same variable identifier. Rather, in each instance of use, the variable identified by "N" may hold the same or a different value than other instances of the same variable identifier.

The following description discloses several preferred embodiments of magnetic storage systems, as well as operation and/or component parts thereof.

Various embodiments described and/or suggested herein find the optimal position to place a robotic accessor in a tape library, preferably while the robotic accessor is idle. In a preferred approach, the optimal position is in a sense the "center of mass" of the tape library, which may be based, at least in part, on one or more of physical location, history of accesses, time of last accesses, etc. of the media therein. The various embodiments described and/or suggested herein minimize the average time to retrieve an arbitrary media item given an arbitrary distribution of the media.

In one general embodiment, a system includes a robotic accessor for transporting media between multiple storage slots and one or more data storage drives; a controller for controlling the robotic accessor; a memory in communication with and/or integrated with the controller for storing information about the media and the storage slots, the information including data corresponding to a physical distribution of the media in the storage slots; and logic integrated with and/or executable by the controller, the logic being adapted to: position the robotic accessor at a computed optimal position during an idle period of the robotic accessor, the computed optimal position being based at least in part on the physical distribution of the media in the storage slots.

In another general embodiment, a method includes positioning a robotic accessor at a computed optimal position during an idle period of the robotic accessor, wherein the robotic accessor is adapted for transporting media between multiple storage slots and one or more data storage drives.

In yet another general embodiment, a method includes determining an optimal position of a robotic accessor relative to a plurality of storage slots based on calculating a center of access using data corresponding to a physical distribution of media in the storage slots, wherein the storage slots are for storing the media therein, wherein the robotic accessor is adapted for transporting the media between the storage slots and one or more data storage drives.

Tape drives and tape cartridges, such as those listed herein, may be used in conjunction with a tape library system. Automated tape libraries are generally large storage devices that have a robotic accessor that moves tape cartridges between storage shelves and tape drives in the library.

An important performance metric for automated tape libraries is the robotic mount rate. This is typically specified in units of robotic mounts per hour, where each mount includes using a robotic accessor (also referred to herein as an accessor, as well as a robot) to transport media (e.g., tape cartridges) between a storage location (e.g., within a library) and a tape drive where data may be read from and/or written to the media. In some tape libraries, media may be stored in 3D arrays (as will be discussed in further detail below), for which the associated robotic accessor may move or "shuffle" media of a given storage slot to gain access to the desired medium therein.

Conventional automated tape libraries typically have the robotic accessor remain in the location of its last cartridge move, resulting in a problem that exists with the robotic mounts per hour performance metric, which assumes that the automated tape library is constantly busy, e.g., that the robotic accessor is constantly moving to mount and/or de-mount tape cartridges. However, in a majority of customer environments, especially in tape libraries that are used in back-end storage to a tape library and/or virtual tape library, the robotic accessor performance is not fully consumed. There are quite often periods of time between cartridge moves where the robot is not performing any commands and is idle. In a large multi-frame tape library this creates the potential of long retrieval times if the last insertion is at an extreme end of the library.

Ideally, an automated tape library's performance metrics would minimize the time required for performing a single cartridge mount to a drive. Various embodiments described and/or suggested herein determine an optimal position to place a robotic accessor in a tape library while the robotic accessor is idle. The optimal position may be considered the "center of mass", e.g., a logical center of mass of the tape library, which according to various approaches, may be based on physical location, history of accesses, time of last accesses, etc. of the media therein, as will be discussed in further detail below. The various embodiments described and/or suggested herein preferably minimize the average time to retrieve an arbitrary media item given an arbitrary distribution of the media.

Figure 2:
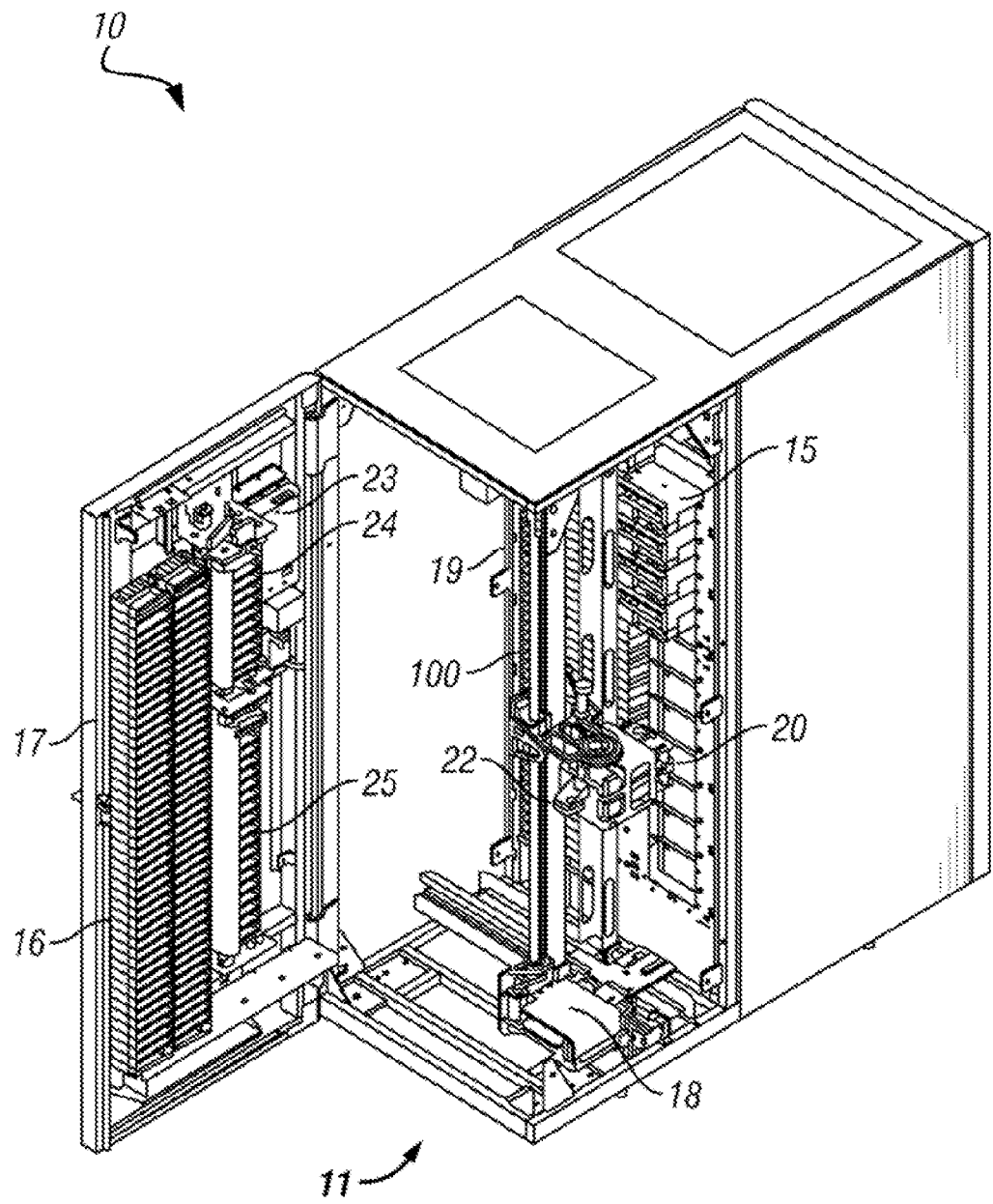
FIG. 2 is a perspective view of a storage frame from the data storage library of FIG. 1.

FIGS. 1-2 illustrate an automated data storage library 10 which stores and retrieves data storage cartridges, containing data storage media (not shown), from multi-cartridge deep slot cells 100 and single cartridge storage slots 16. An example of an automated data storage library which has a similar configuration as that depicted in FIGS. 1-2, and may be implemented with some of the various approaches herein is the IBM 3584 UltraScalable Tape Library. Moreover, it should be noted that references to "data storage media" herein refer to data storage cartridges, and for purposes of the present application, the two terms may be used synonymously.

The library 10 of FIG. 1 comprises a left hand service bay 13, one or more storage frames 11, and right hand service bay 14. As will be discussed in further detail below, a frame may comprise an expansion component of the library. Thus, storage frames may be added or removed to expand or reduce the size and/or functionality of the library. According to different approaches, frames may include additional storage slots, deep slot cells, drives, import/export stations, accessors, operator panels, etc.

FIG. 2 shows an exemplary embodiment of a storage frame 11, which acts as the base frame of the library 10. Moreover, the storage frame 11 illustrated in FIG. 2 is contemplated to be a minimum configuration of the library 10, for which there is only a single accessor 18 (i.e., there are no redundant accessors) and no service bay. However, in other embodiments, a storage frame may include multiple robotic accessors and/or service bays.

Looking to FIG. 2, the library 10 is arranged for accessing data storage media in response to commands from at least one external host system (not shown). The library 10 includes a plurality of storage slots 16 on front wall 17 and a plurality of multi-cartridge deep slot cells 100 on rear wall 19, both of which may be used to storing data storage cartridges that may contain data storage media. According to one approach, the storage slots 16 are configured to store a single data storage cartridge and may also be referred to herein as a 2D array of storage slots. Moreover, the multi-cartridge deep slot cells 100 are configured to store a plurality of data storage cartridges, and are also referred to herein as a 3D array of storage slots. In a preferred approach, the multi-cartridge deep slot cells may be arranged in sequential order of tiers from front to rear (e.g., see FIG. 7A).

Figure 5A:
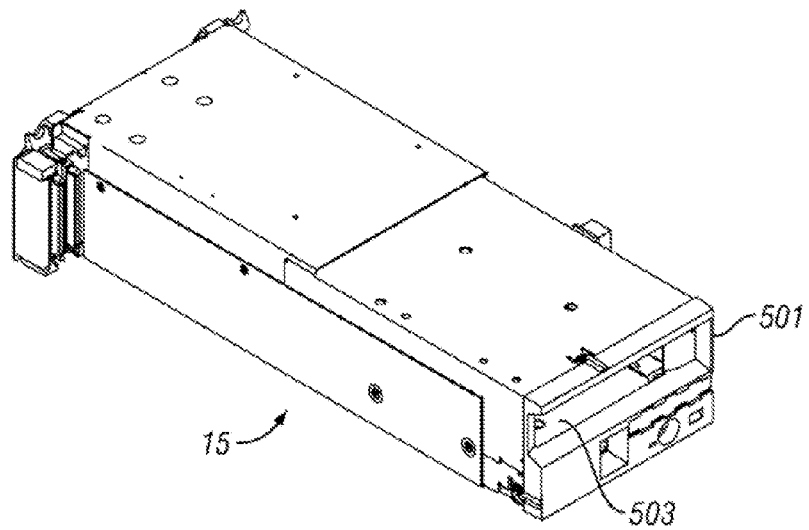
FIG. 5A is a frontal perspective view of a data storage drive according to one embodiment.
Figure 5B:
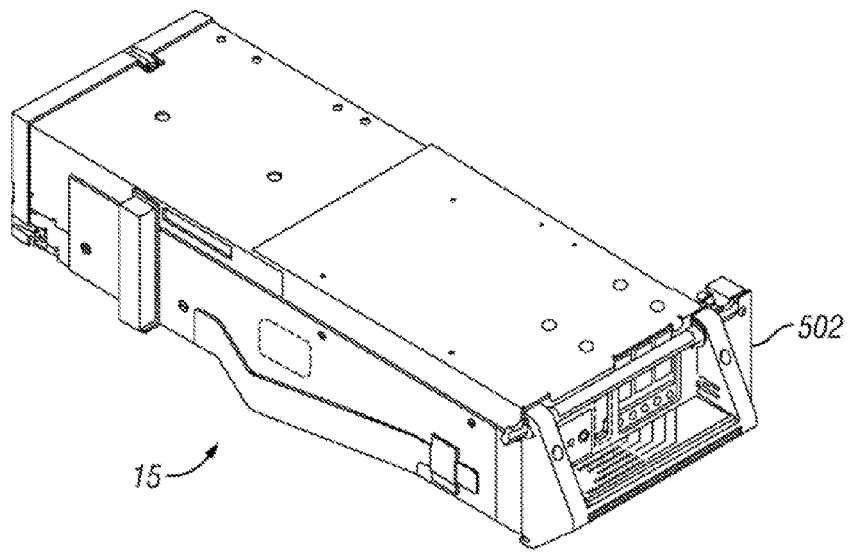
FIG. 5B is a rear perspective view of the data storage drive of FIG. 5A.

Furthermore, the storage frame 11 of the library 10 also includes at least one data storage drive 15, e.g., for reading and/or writing data with respect to the data storage media. FIGS. 5A-5B illustrate the front 501 and rear 502 views of a data storage drive 15, according to an exemplary embodiment, which is in no way intended to limit the invention. In the example depicted in FIGS. 5A-5B, the data storage drive 15 comprises a hot-swap drive canister, which is in no way intended to limit the invention. In fact, various configurations of data storage drives may be used whether or not they include a hot-swap canister. As mentioned above, a data storage drive 15 may be used to read and/or write data with respect to the data storage media. In another approach, the data storage drive 15 may additionally communicate with a memory, which is separate from the media, and located within the cartridge. Thus, according to one approach, a data storage cartridge may be placed into the data storage drive 15 at opening 503.

Figure 6:
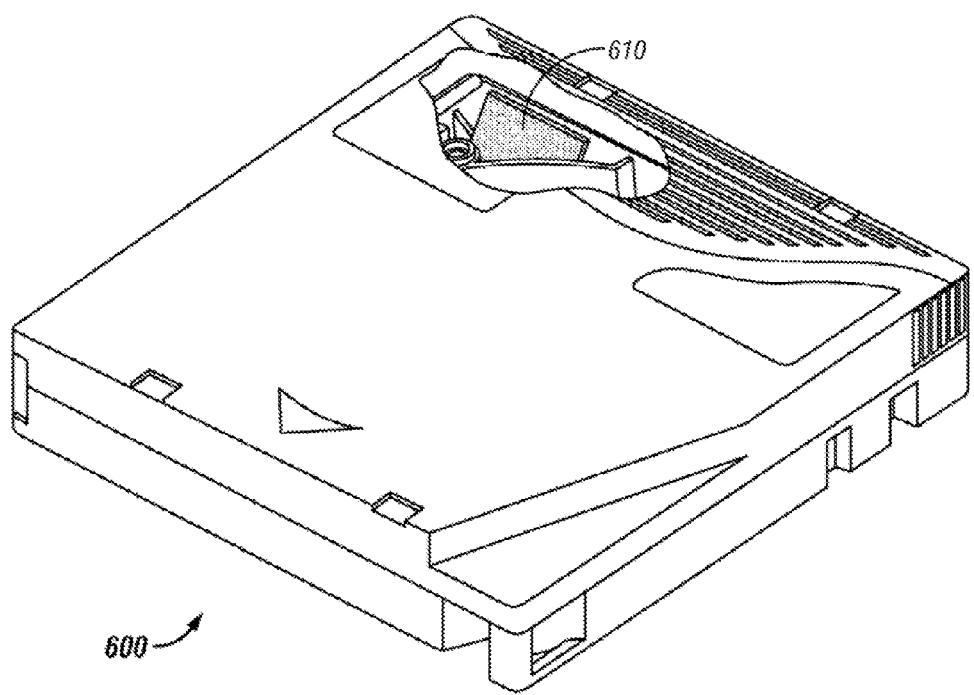
FIG. 6 is perspective view of a data storage cartridge having a cutaway portion, according to one embodiment.

A removable storage volume, e.g., a data storage cartridge 600, may generally be loaded into each of the data storage drives 15. According to various approaches, the data storage drives 15 may be optical disk drives, magnetic tape drives, or other types of data storage drives as are used to read and/or write data with respect to the data storage media. FIG. 6 illustrates an exemplary embodiment of a data storage cartridge 600 with a cartridge memory 610 shown in a cutaway portion of the illustration, which is in no way intended to limit the invention. In fact, various configurations of data storage cartridges may be used whether or not they include a cartridge memory. In different approaches, media of the data storage cartridge media may include any type of media on which data may be stored, including but not limited to magnetic media, e.g., magnetic tape, disks, etc.; optical media, e.g., optical tape, disks, etc.; electronic media, e.g., PROM, EEPROM, flash PROM, CompactFlash™, Smartmedia™, Memory Stick™, etc.; etc., or other suitable media. Moreover, an example of a data storage cartridge that is widely employed in automated data storage libraries for mass data storage is a magnetic tape cartridge in which the media is magnetic tape.

With continued reference to FIG. 2, the data storage drives 15 are serviced by a first robotic accessor 18 (also referred to herein as an accessor, as well as a robot). The first robotic accessor 18 transports media between the plurality of storage slots 16, the multi-cartridge deep slot cells 100, and the data storage drive(s) 15 data storage drive, as will be described in further detail below.

With continued reference to the embodiment illustrated in FIG. 2, the media includes tape media in tape cartridges (e.g., see 600 of FIG. 6). Thus, the first robotic accessor 18 preferably transfers selected tape cartridges between data storage drives 15 and their corresponding positions within a tape cartridge repository. However, according to different approaches, media transported by a robotic accessor between multiple storage slot 16 and/or cells 100 and one or more data storage drives 15 may include optical media stored on optical discs, etc.

Furthermore, the library 10 may typically include storage management software utilized to monitor the active space on the tape cartridges and schedule reclamations of tape cartridges when the system is less active. According to an illustrative approach, which is in no way intended to limit the invention, the data storage library 10 may include a tape library system, such as the IBM Virtualization Engine TS 7740 and IBM TS 3500.

As described above, the storage frames 11 may be configured with different components depending upon the intended function. One configuration of storage frame 11 may comprise storage slots 16 and/or multi-cartridge deep slot cells 100, data storage drive(s) 15, and other optional components to store and retrieve data from the data storage cartridges. However, in another approach, a storage flame 11 may include storage slots 16 and/or multi-cartridge deep slot cells 100 and no other components. In yet another approach, the first accessor 18 may have a gripper assembly 20, e.g., for gripping one or more data storage media, in addition to having a bar code scanner 22 or other reading system, such as a cartridge memory reader or similar system mounted on the gripper assembly 20, to "read" identifying information about the data storage media.

According to another embodiment, the storage frame 11 of the library 10 may optionally include an operator panel 23 or other user interface, e.g., a web-based interface, which allows a user to interact with the library 10. The storage frame 11 may also optionally comprise an upper I/O station 24 and/or a lower I/O station 25, thereby allowing data storage cartridges to be added (e.g., inserted) to the library inventory and/or removed from the library without disrupting library operation. Furthermore, the library 10 may have one or more storage frames 11, each having storage slots 16 and/or cells 100 preferably accessible by the first accessor 18.

Figure 3:
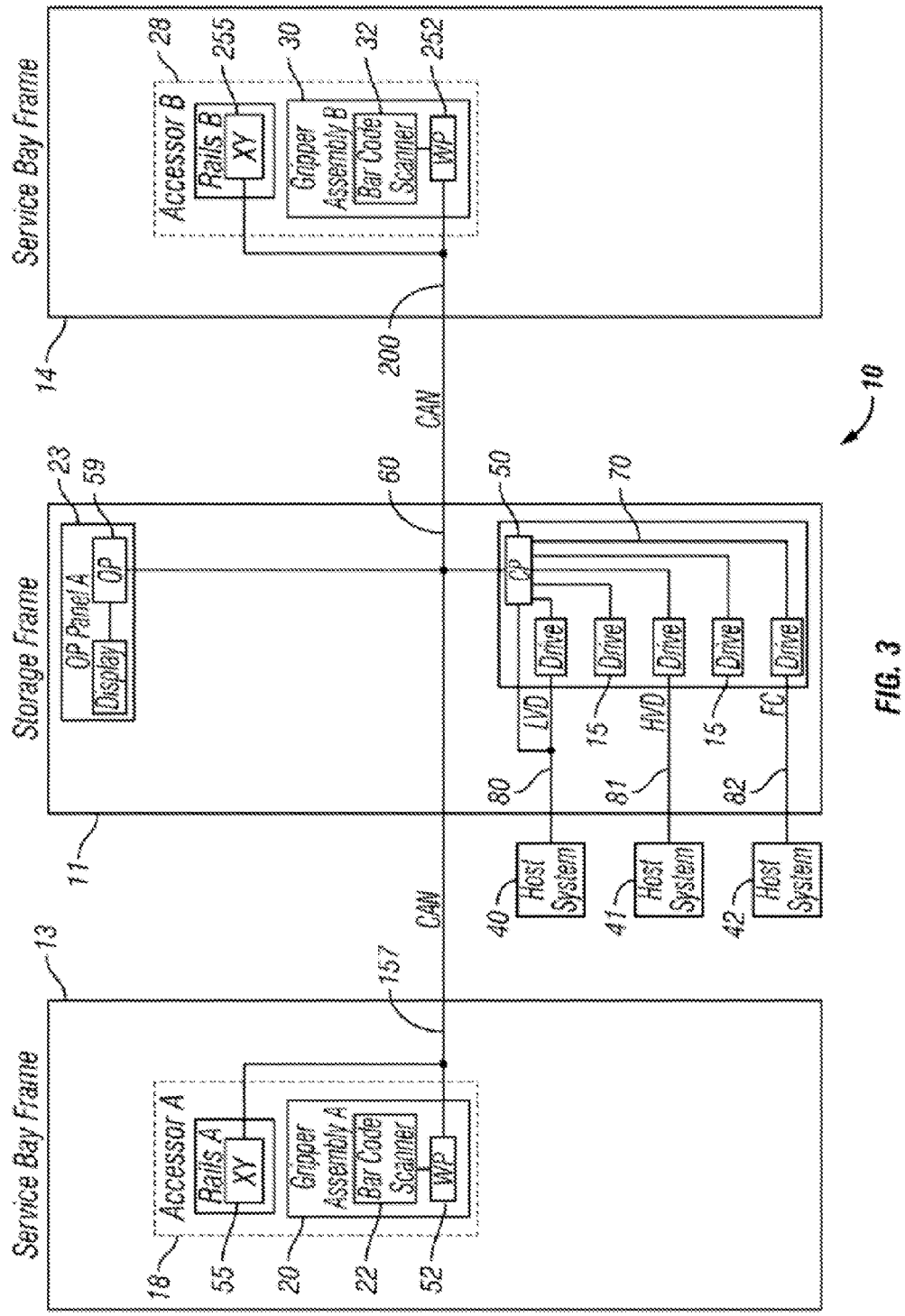
FIG. 3 is a block diagram of an automated data storage library according to one embodiment.

FIG. 3 depicts an automated data storage library 10, in accordance with one embodiment. As an option, the present automated data storage library 10 may be implemented in conjunction with features from any other embodiment listed herein, such as those described with reference to the other FIGS. Of course, however, such automated data storage library 10 and others presented herein may be used in various applications and/or in permutations which may or may not be specifically described in the illustrative embodiments listed herein. Further, the automated data storage library 10 presented herein may be used in any desired environment. Thus FIG. 3 (and the other FIGS.) should be deemed to include any and all possible permutations.

Referring now to FIG. 3, the automated data storage library 10 as described in reference to FIGS. 1 and 2, is depicted according to one embodiment. According to a preferred approach, the library 10 may employ a controller, e.g., arranged as a distributed system of modules with a plurality of processor nodes as will be discussed in further detail below.

According to an exemplary embodiment, an automated data storage library which may implement the distributed system depicted in the block diagram of FIG. 3, and/or other approaches presented herein, is the IBM 3584 UltraScalable Tape Library. For a fuller understanding of a distributed control system incorporated in an automated data storage library, refer to U.S. Pat. No. 6,356,803, which is entitled "Automated Data Storage Library Distributed Control System," and is hereby incorporated by reference.

While the automated data storage library 10 has been described as employing a distributed control system, various other approaches described and/or suggested herein may be implemented in automated data storage libraries regardless of control configuration, such as, but not limited to, an automated data storage library having one or more library controllers that are not distributed, as that term is defined in U.S. Pat. No. 6,356,803.

Referring still to FIG. 3, the library 10 may have one or more storage frames 11, a left hand service bay 13 and a right hand service bay 14. The left hand service bay 13 is shown with a first accessor 18, where, as discussed above, the first accessor 18 may include a gripper assembly 20 and/or a reading system 22 to "read" identifying information about the data storage media depending on the desired embodiment. Furthermore, the right hand service bay 14 is shown having a second accessor 28, which includes a gripper assembly 30 and may also include a reading system 32 to "read" identifying information about the data storage media.

According to one approach, the library 10 may receive commands from one or more host systems 40, 41, 42. The host systems 40, 41, 42, such as host servers, communicate with the library directly, e.g., on path 80, through one or more control ports (not shown), or through one or more data storage drives 15 on paths 81, 82. Thus, in different approaches, the host systems 40, 41, 42 may provide commands to access particular data storage cartridges and move the cartridges, for example, between the storage slots 16 and the data storage drives 15. The commands are typically logical commands identifying the cartridges or cartridge media, and/or logical locations for accessing the media. Furthermore, it should be noted that the terms "commands" and "work requests" are used interchangeably herein to refer to such communications from the host system 40, 41, 42 to the library 10 as are intended to result in accessing particular data storage media within the library 10 depending on the desired approach.

According to one embodiment, the library 10 may be controlled by a library controller. Moreover, in various approaches, the library controller may include a distributed control system receiving the logical commands from hosts, determining the required actions, and/or converting the actions to physical movements of the first and: or second accessors 18, 28. In another approach, the distributed control system may have a plurality of processor nodes, each having one or more computer processors. According to one example of a distributed control system, a communication processor node 50 may be located in a storage frame 11. The communication processor node provides a communication link for receiving the host commands, either directly or through the drives 15, via at least one external interface, e.g., coupled to line 80.

Still referring to FIG. 3, the communication processor node 50 may additionally provide a communication link 70 for communicating with the data storage drives 15. As illustrated, the communication processor node 50 may preferably be located in the storage frame 11, e.g., close to the data storage drives 15. Furthermore, one or more additional work processor nodes may be provided to form an exemplary distributed processor system, which may comprise, e.g., a work processor node 52 located at first accessor 18, and that is coupled to the communication processor node 50 via a network 60, 57. According to different approaches, each work processor node may respond to received commands that are broadcast thereto from any communication processor node, and the work processor nodes may also direct the operation of the accessors, e.g., providing move commands. An XY processor node 55 may be provided and may be located at an XY system of first accessor 18. As illustrated, the XY processor node 55 is coupled to the network 60, 157, and is responsive to the move commands, operating the XY system to position the gripper 20 as will be discussed in further detail below.

Also, an operator panel processor node 59 may be provided at the optional operator panel 23 for providing an interface for communicating between the operator panel and the communication processor node 50, the work processor nodes 52, 252, and the XY processor nodes 55, 255.

A network 60, for example comprising a common bus, is provided, coupling the various processor nodes. The network may comprise a robust wiring network, such as the commercially available Controller Area Network (CAN) bus system, which is a multi-drop network, having a standard access protocol and wiring standards, for example, as defined by CiA, the CAN in Automation Association, Am Weich Selgarten 26, D-91058 Erlangen, Germany. Other networks, such as Ethernet, or a wireless network system, such as RF or infrared, may be employed in the library as is known to those of skill in the art. In addition, multiple independent networks may also be used to couple the various processor nodes.

As illustrated in FIG. 3, the communication processor node 50 is coupled to each of the data storage drives 15 of a storage frame 11, via lines 70, and are thereby communicating with the drives 15 and with host systems 40, 41, 42. Alternatively, the host systems 40, 41, 42 may be directly coupled to the communication processor node 50, at input 80 for example, or to control port devices (not shown) which connect the library to the host system(s) with a library interface similar to the drive/library interface. As is known to those of skill in the art, various communication arrangements may be employed for communication with the hosts and with the data storage drives. In the example of FIG. 3, host connections 80 and 81 are intended to be SCSI busses. However, bus 82 comprises an example of a Fibre Channel bus which is a high speed serial data interface, allowing transmission over greater distances than the SCSI bus systems.

According to some approaches, the data storage drives 15 may be in close proximity to the communication processor node 50, and may employ a short distance communication scheme, such as SCSI, or a serial connection, such as RS-422. Thus the data storage drives 15 may be individually coupled to the communication processor node 50 by means of lines 70. Alternatively, the data storage drives 15 may be coupled to the communication processor node 50 through one or more networks, such as a common bus network.

Furthermore, additional storage frames 11 may be provided, whereby each is preferably coupled to the adjacent storage frame. According to various approaches, any of the additional storage frames 11 may include communication processor nodes 50, storage slots 16, data storage drives 15, networks 60, etc.

Moreover, as described above, the automated data storage library 10 may comprise a plurality of accessors. A second accessor 28, for example, is shown in a right hand service bay 14 of FIG. 3. The second accessor 28 may include a gripper assembly 30 for accessing the data storage media, and an XY system 255 for moving the second accessor 28.

According to one approach, in the event of a failure or other unavailability of the first accessor 18, or its gripper assembly 20, etc., the second accessor 28 may perform some or all of the functions of the first accessor 18. Thus in different approaches, the two accessors 18, 28 may share one or more mechanical paths, they may have completely independent mechanical paths, or combinations thereof. In one example, the accessors 18, 28 may have a common horizontal rail with independent vertical rails to travel therealong. Moreover, it should be noted that the first and second accessors 18, 28 are described as first and second for descriptive purposes only and this description is not meant to limit either accessor to an association with either the left hand service bay 13, or the right hand service bay 14.

In an exemplary embodiment which is in no way intended to limit the invention, the first and/or second accessors 18, 28 may move in at least two directions, called the horizontal "X" direction and vertical "Y" direction, e.g., to retrieve and grip, deliver and release, load and unload, etc. a data storage cartridge at the storage slots 16 and/or multi-cartridge deep slot cells 100. However, according to a further approach, a tiering value, e.g., z coordinate, may be incorporated with a 31) array of data storage slots. e.g., multi-cartridge deep slot cells 100, as will be discussed in extensive detail below.

In FIG. 3 and the accompanying description, the first and second accessors are associated with the left hand service bay 13 and the right hand service bay 14 respectively. However, as mentioned above, this is for illustrative purposes and there may not be an actual association. Thus, according to another approach, network 157 may not be associated with the left hand service bay 13 and network 200 may not be associated with the right hand service bay 14. Moreover, depending on the design of the library, it may not be necessary to have a left hand service bay 13 and/or a right hand service bay 14 at all.

An automated data storage library 10 typically comprises one or more controllers to direct the operation of the automated data storage library. Moreover, host computers and data storage drives typically include similar controllers. A library controller may take many different forms and may comprise, for example, but is not limited to, an embedded system, a distributed control system, a personal computer, a workstation, etc. Essentially, the term "library controller" as used herein is intended in its broadest sense as a device that contains at least one computer processor, as such term is defined herein.

Thus, the storage frame 11 may also include a controller, e.g., for controlling the first and/or second robotic accessors 18, 28. In one approach, a controller may be used to install, maintain, configure, and/or operate the storage frame 11 of the data storage library 10. Furthermore, within the storage frame 11, one or more of the robotic accessors 18, 28 may be controlled utilizing a controller based upon inputs received from the upper and/or lower I/O stations 24, 25. According to various approaches, the controller may be integrated with the storage frame 11, and/or may be a host coupled to the library 10. Thus, in one such approach, a host may act as a controller.

Figure 4:
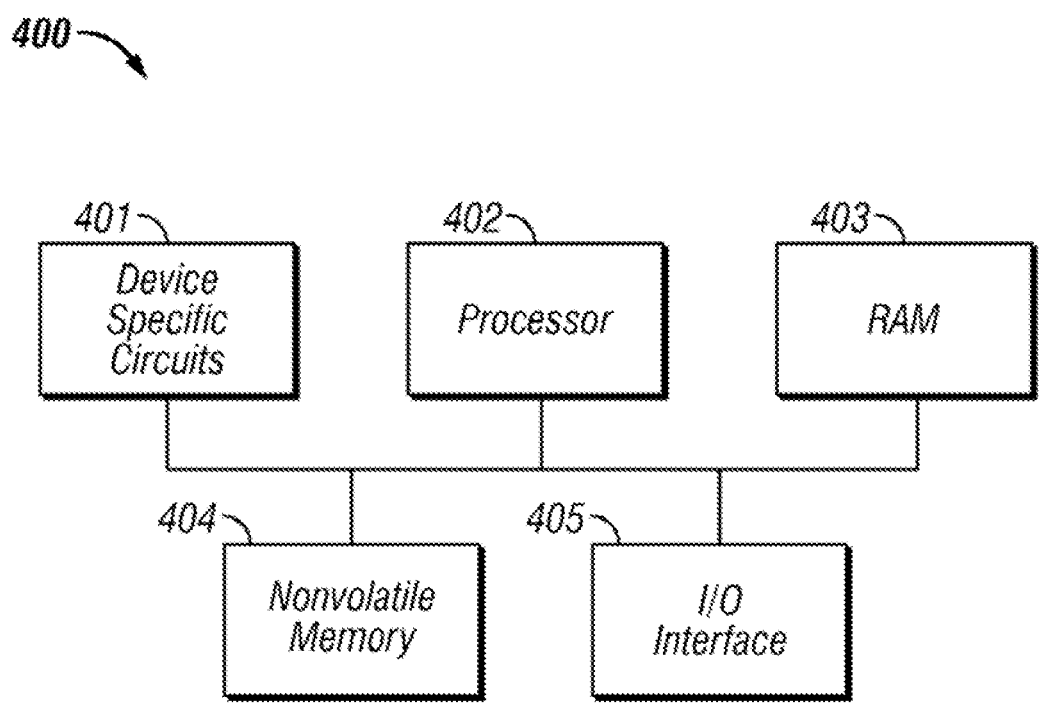
FIG. 4 is a block diagram depicting a controller configuration according to one embodiment.

Referring now to FIG. 4, a typical controller 400 is shown with a processor 402, Random Access Memory (RAM) 403, nonvolatile memory 404, device specific circuits 401, and I/O interface 405. Alternatively, the RAM 403 and/or nonvolatile memory 404 may be contained in the processor 402 as could the device specific circuits 401 and I/O interface 405. The processor 402 may comprise, for example, an off-the-shelf microprocessor, custom processor, Field Programmable Gate Array (FPGA), Application Specific Integrated Circuit (ASIC), discrete logic, etc. The RAM 403 is typically used to hold variable data, stack data, executable instructions, etc.

According to various approaches, the nonvolatile memory 404 may comprise any type of nonvolatile memory such as, but not limited to, Electrically Erasable Programmable Read Only Memory (EEPROM), flash Programmable Read Only Memory (PROM), battery backup RAM, hard disk drives, etc. However, the nonvolatile memory 404 is typically used to hold the executable firmware and any nonvolatile data. Moreover, the I/O interface 405 comprises a communication interface that allows the processor 402 to communicate with devices external to the controller. Examples may comprise, but are not limited to, serial interfaces such as RS-232, USB (Universal Serial Bus) or Small Computer Systems Interface (SCSI). The device specific circuits 401 provide additional hardware to enable the controller 400 to perform unique functions including, but not limited to, motor control of a cartridge gripper. Moreover, the device specific circuits 401 may include electronics that provide, by way of example but not limitation, Pulse Width Modulation (PWM) control, Analog to Digital Conversion (ADC), Digital to Analog Conversion (DAC), etc. In addition, all or part of the device specific circuits 401 may reside outside the controller 400.

While the automated data storage library 10 is described as employing a distributed control system, the various approaches described and/or suggested herein may be implemented in various automated data storage libraries regardless of control configuration, including, but not limited to, an automated data storage library having one or more library controllers that are not distributed. Moreover, a library controller may comprise one or more dedicated controllers of a library, depending on the desired embodiment. For example, there may be a primary controller and a backup controller. In addition, a library controller may comprise one or more processor nodes of a distributed control system. Moreover the illustrative control system may additionally include an extension network 200 which forms a network coupled to network 60 of the storage frame(s) 11 and to network 157 of left hand service bay 13 as illustrated in FIG. 3.

According to one example, communication processor node 50 (e.g., of FIG. 3) may comprise the library controller while the other processor nodes (if present) may assist the library controller and/or may provide backup or redundant functionality. In another example, communication processor node 50 and work processor node 52 may work cooperatively to form the library controller while the other processor nodes (if present) may assist the library controller and/or may provide backup or redundant functionality. Still further, all of the processor nodes may comprise the library controller. According to various approaches described and/or suggested herein, a library controller may have a single processor or controller, or it may include multiple processors or controllers.

Furthermore, a memory, e.g., of any type known in the art, may be in communication with and/or integrated with the controller via a physical connection, e.g., a cable, wire, logical bus, lead, etc.; a wireless connection e.g., an antenna, receiver, etc.; etc. According to one approach, the memory may be in communication with and/or integrated with the controller for storing information about the media and the storage slots. In various approaches, the information about the media and the storage slots may include a backup of the media stored therein; location information; amount of data stored in each medium; access information for each medium, e.g., the total number of times a given medium has been accessed over some time period T, the time of the first access to a given medium, the time of the most recent access, etc.; etc. However, in a preferred approach, the information may include data corresponding to a physical distribution of the media in an array of storage slots. For example, in different embodiments, storage slots may be configured in a 2D and/or 3D array.

As described above, in a 2D array of storage slots, each storage slot may only be able to store one media cartridge therein. Therefore, the data may merely correspond to whether or not a medium is present in each storage slot of the 2D array. Moreover, in one approach, the data may include positioning information, e.g., x and/or y coordinates characterizing each of the media's location within the 2D array.

However, according to another approach, in a 3D array of data storage slots, a tiering dimension (e.g., depth) may be present in the array of storage slots. As a result, a medium may be stored at each of the respective tiers of a storage slot, thereby allowing more than one of the media to be stored within each data storage slot. In a further approach, a tiering value, e.g., z coordinate, may be used with a 3D array of data storage slots, thereby allowing reference to be made to each of the potentially multiple mediums stored within each data storage slot, at multiple tiers (e.g., depths). Thus, in one approach, the data corresponding to the physical distribution of media in the storage slots capable of storing more than one of the media (e.g., a 3D array of storage slots) may include a tiering value indicative of a position of each medium in the storage slot associated therewith. As a result, data regarding a 3D array may indicate which storage slots have media therein, in addition to the media's relative tier position (e.g., depth) in each of the respective storage slots. According to an illustrative approach, which is in no way intended to limit the invention, the data may include a 3-tuple (x,y,z), e.g., to indicate a media's position in a 3D array of storage slots.

In another approach, data corresponding to the physical distribution of the media in the storage slots may optionally indicate empty storage slots and/or empty tier positions within the storage slots as well, e.g., for 2D and/or 3D arrays. Moreover, in various approaches, the position of a medium in a storage slot and/or array of storage slots may refer to its actual position, a logical position, etc. therein. An example of the latter may refer to identification of an occupied cell of a multi-cartridge storage device in a slot, e.g., as described in U.S. Pat. No. 7,483,236, which is herein incorporated by reference.

According to various other approaches, the controller may also be, or include, a processor and/or any logic for controlling any subsystem of the storage system 10. Thus, logic may be integrated with and/or executable by the controller, depending on the desired embodiment. According to one approach, logic integrated with and/or executable by the controller may be adapted to position the robotic accessor 18 and/or 28 at a computed optimal position during an idle period of the robotic accessor, as discussed in further detail below. However, according to other approaches, the robotic accessor may be positioned at a computed optimal position upon user command, after a predefined amount of time, etc.

In a preferred approach, an idle period may be defined as a period when the robotic accessor is not being used to transport media. Thus, as described above, once the request queue for a robotic accessor is empty, rather than keep the robot at the location of last insertion, the robotic accessor is preferably relocated to the computed optimal position (also referred to herein as the center of access). However, according to various approaches, the idle period may be predefined, selected by a user, determined by the controller, preprogrammed into the library, computed based on historical usage of the robotic accessor, etc.

Furthermore, according to one approach, unless the idle period is longer than a given amount of time, a new optimal position may not be calculated and/or the robotic accessor may not be moved thereto. However, if a recalculation and/or movement of the robotic accessor has initiated upon receiving a new request, the recalculation and/or movement may be abandoned and possibly resumed at the next idle period.

In a preferred approach, to determine the optimal position, the temporal and physical characteristics of media in an array (e.g., 3D arrays, 2D arrays, and/or combinations thereof) are used to form a two dimensional weight matrix. According to different approaches, the temporal and physical characteristics of media may be calculated using one or more formulas. Examples of such formulae are discussed in further detail below (see Equations 1-3). The two dimensional weight matrix provides a weighted value for each storage slot of the array which, as described above, may be referenced with a tuple (x,y), even if the array is a 3D array of storage slots. Furthermore, the weighted value of each storage slot may be used to determine the optimal position of the robotic accessor(s) with respect to the array as a whole. Thus, according to one approach, the two dimensional weight matrix effectively collapses a 3D array into a 2D array, while also being able to provide a distribution for 2D arrays. It follows that, according to a preferred approach, the computed optimal position is, statistically, the most optimal place to position the robotic accessor, e.g., with respect to minimizing data access time.

Furthermore, the physical optimal location of the robotic accessor may be calculated using the two dimensional weight matrix and a transformation function. In a preferred approach, the transformation function maps the logical coordinates to physical horizontal (e.g., x) and vertical (e.g., y) coordinates which the robotic controller may travel to.

With regard to the exemplary embodiments described below, the storage slots of a tape library may be configured in 3D and/or 2D arrays of storage slots. Thus, in one approach, the robotic accessor may move in the x-y plane for both 3D and 2D arrays, where the tiered storage slots of 3D arrays further extend in the z direction.

Again referring to the exemplary embodiments described below, some description of the notation used therein is provided, which is in no way intended to limit the invention. Preferably the maximum size for each dimension x, y, z is noted by Nx, Ny, Nz respectively. Moreover, the numbering of the tiers start with zero (e.g., the numbering of the tiers is 0 based); thus the location of any cell a 3D array can be referenced with a 3-tuple (x,y,z), and the location of any cell a 2D array can be referenced with a tuple (x,y), where:

$$x =: 0, 1, \ldots, Nx-1$$

$$y =: 0, 1, \ldots, Ny-1$$

$$z =: 0, 1, \ldots, Nz-1$$

Furthermore, the following functions and/or constant values and their respective definitions are provided in supplement to the exemplary embodiments described below.

CART(x,y,z) is equal to 1 for a given storage slot (x,y,z) if a medium is present therein, and equal to 0 otherwise.

ACCESS_COUNT(x,y,z) computes the number of accesses for a medium in a given storage slot (x,y,z).

FIRST_ACCESS(x,y,z) computes the time of first access to a medium in a given storage slot (x,y,z).

LAST_ACCESS(x,y,z) computes the time of the most recent access to a medium in a given storage slot (x,y,z).

$W_0$ represents the weighting factor given to the first tier (z=0), which may be used as a cache.

NOW represents the current time, which is expressed in the same units as those used by functions FIRST_ACCESS(x,y,z) and LAST_ACCESS(x,y,z).

SUM(i,start,end)[β] computes the sum of β for "i" (where "i" is the index to be referenced), starting at "start" and incrementing to "end".

WEIGHT(x,y) computes the weight value (for the two dimensional weight matrix) corresponding to a given storage slot (x,y,z).

A two dimensional weight matrix of size (Nx,Ny) is constructed for which each entry WEIGHT(x,y) is equal to the number of medium summed over the tiers at a given storage slot (x,y). Thus, in 2D arrays, each entry results in a value of 1 or 0, e.g., as each storage slot is only able to store one medium therein. However, for 3D arrays, each entry may result in a value of 0, 1, . . . , Nz, e.g., as a medium may potentially be present in each of the Nz tiers for a given storage slot.

As described above, the computed optimal position may be calculated using the two dimensional weight matrix. Thus, in a preferred approach, the computed optimal position may be determined (e.g., by the controller) based on calculating a center of access using at least the data and/or other data (e.g., data derived from the stored data) corresponding to the physical distribution of the media in the storage slots. Moreover, according to one approach, the computed optimal position may preferably be at about the calculated center of access, but is not limited thereto.

According to an exemplary embodiment which is in no way intended to limit the invention, the computed optimal position may be determined using the two dimensional weight matrix WEIGHT(x,y) calculated using Equation 1 as follows.

$$\text{WEIGHT}(x, y) = W_0 * \text{CART}(x, y, 0) + \sum_{k=1}^{N_z-1} \text{CART}(x, y, k) \quad \text{Equation 1}$$

Looking to Equation 1, the two dimensional weight matrix WEIGHT(x,y) is calculated using the physical distribution of the media in the storage slots. Moreover, Equation 1 incorporates a weight parameter $W_0$ which may be set to a desired value which corresponds to the weight assigned to the first tier (z=0) of a given storage slot (x,y,z). According to one approach, the weighting parameter may be set to 1 ($W_0$=1) if it is desired to offset the weighting factor for a particular storage slot.

Through simulations, the inventors have found that by incorporating Equation 1 in determining the computed optimal position, the time required for the robotic accessor to move to an arbitrary cartridge has been reduced on average by about 20%, and a maximum of about 50%, depending on library size and configuration.

According to another approach, the computed optimal position may be further determined based on numbers of accesses of the media. Thus, according to another exemplary embodiment, which is in no way intended to limit the invention, the computed optimal position may be determined using the two dimensional weight matrix WEIGHT(x,y) calculated using Equation 2 as follows.

$$\text{WEIGHT}(x, y) = \quad \text{Equation 2}$$
$$W_0 * \text{ACCESS\_COUNT}(x, y, 0) * \text{CART}(x, y, 0) +$$
$$\sum_{k=1}^{N_z-1} \text{ACCESS\_COUNT}(x, y, k) * \text{CART}(x, y, k)$$

Looking to Equation 2, the total number of accesses for a given medium is summed over the tiers for a given storage slot (x,y,z). Thus, in a preferred approach, Equation 2 may be used to weight storage slots containing media which has been accessed frequently, higher than the storage slots that do not. According to one approach, the total number of accesses may be for a given amount of time, e.g., accesses older than a certain amount of time may be removed from consideration.

In a further approach, a user, administrator, controller, etc. may be able to remove certain access data from consideration. For example, a user may move (e.g., access) certain media within a storage slot and/or between storage slots for upkeep which may skew the computed optimal position towards the location of the user's activity unless such accesses are removed from consideration.

Moreover, in yet another approach, the computed optimal position may be further determined based on times of access of the media. Thus, according to yet another exemplary embodiment, which is in no way intended to limit the invention, the computed optimal position may be determined using the two dimensional weight matrix WEIGHT(x,y) calculated using Equation 3 as follows.

$$\text{WEIGHT}(x, y) = \frac{W_0 * \text{ACCESS\_COUNT}(x, y, 0)}{\text{HOW\_RECENT}(x, y, 0)} + \quad \text{Equation 3}$$
$$\sum_{k=1}^{N_z-1} \frac{\text{ACCESS\_COUNT}(x, y, k) * \text{CART}(x, y, k)}{\text{HOW\_RECENT}(x, y, k)}$$

where:

$$\text{HOW\_RECENT}(x, y, z) = \frac{\text{NOW} - \text{LAST\_ACCESS}(x, y, z)}{\text{NOW} - \text{FIRST\_ACCESS}(x, y, z)}$$

Referring now to Equation 3, the time of last access, in addition to the total number of accesses for each medium, is summed over the tiers for a given storage slot (x,y,z). Thus, media which has been accessed more recently receives a higher weighting factor than media which has been accessed at an earlier time.

Moreover, according to various other approaches the computed optimal position may be further determined based on times of access, time of last access; frequency of access, i.e., number of accesses in a certain period of time; etc. of the media. Thus, in a preferred approach, Equation 3 may be used to weight storage slots containing media which has been accessed more frequently as well as more recently, higher than the storage slots that do not.

As previously mentioned, once the two dimensional weight matrix WEIGHT(x,y) has been calculated using any of the equations presented above, the two dimensional weight matrix is preferably used to determine the computed optimal position.

According to one approach, the computed optimal position is then preferably transformed to physical coordinates using a transformation function. In different approaches, the transformation function may depend on the physical characteristics of the library system. Moreover, in a preferred approach, given a two dimensional weight matrix, the computed optimal position (COP) may be determined using a weighted average over the x and y dimensions (e.g., transformation function), represented by Equation 4 and Equation 5 respectfully.

$$COP_x = \frac{\sum_{i=0}^{N_x-1} \sum_{j=0}^{N_y-1} \text{WEIGHT}(t, f) * t}{\sum_{i=0}^{N_x-1} \sum_{j=0}^{N_y-1} \text{WEIGHT}(t, f)} \quad \text{Equation 4}$$

$$COP_y = \frac{\sum_{i=0}^{N_x-1} \sum_{j=0}^{N_y-1} \text{WEIGHT}(t, f) * f}{\sum_{i=0}^{N_x-1} \sum_{j=0}^{N_y-1} \text{WEIGHT}(t, j)} \quad \text{Equation 5}$$

Thus, the computed optimal position may be defined as COP=(COP$_x$, COP$_y$).

According to different approaches, the computed optimal position may be calculated for 2D and/or 3D arrays of data storage slots using any of the approaches described and/or suggested herein, or combinations thereof. However, choice of implementation may depend on the overall usage of the arrays, user preferences, predefined preferences, controller commands, logic, etc. According to an exemplary approach, which is in no way intended to limit the invention, a system may have the ability to calculate a two dimensional weight matrix using any of Equations 1-3 listed above. Furthermore, a user may select one of the equations to calculate the two dimensional weight matrix, based on their system, conditions, data distribution, etc. when determining the computed optimal position. Therefore, in different situations, the user may be able to bias the computed optimal position, e.g., depending on the equation chosen to calculate the two dimensional weight matrix.

In some embodiments, the approaches described and/or suggested herein may be used in combination with at least two robotic accessors, at least three robotic accessors, etc. Moreover, any of the approaches described and/or suggested herein may be restricted to an arbitrary subset of a library to determine a computed optimal position of the arbitrary subset. For example, a library system may include two robotic accessors, each of which may service a respective zone within the overall library system. Thus, a computed optimal position may be determined for each of the zones by incorporating any of the approaches described and/or suggested herein.

In another approach, a library system may include multiple robotic accessors, each of which may service a different type of media (e.g., high volume media, low priority media, media to be written to, media to be read, etc.). Thus, each of the robotic accessors may correspond to a different computed optimal position based on the data corresponding to a physical distribution of the respective type of media in the storage slots.

In yet another approach, a library system may include multiple robotic accessors, each of which may operate at different speeds, e.g., some robotic accessors may be faster than others, designed to carry larger media, etc. Thus, each of the robotic accessors may correspond to a different computed optimal position based on the data corresponding to a physical distribution of the media locations which the respective robotic accessors may be able to efficiently access.

Figure 7A:
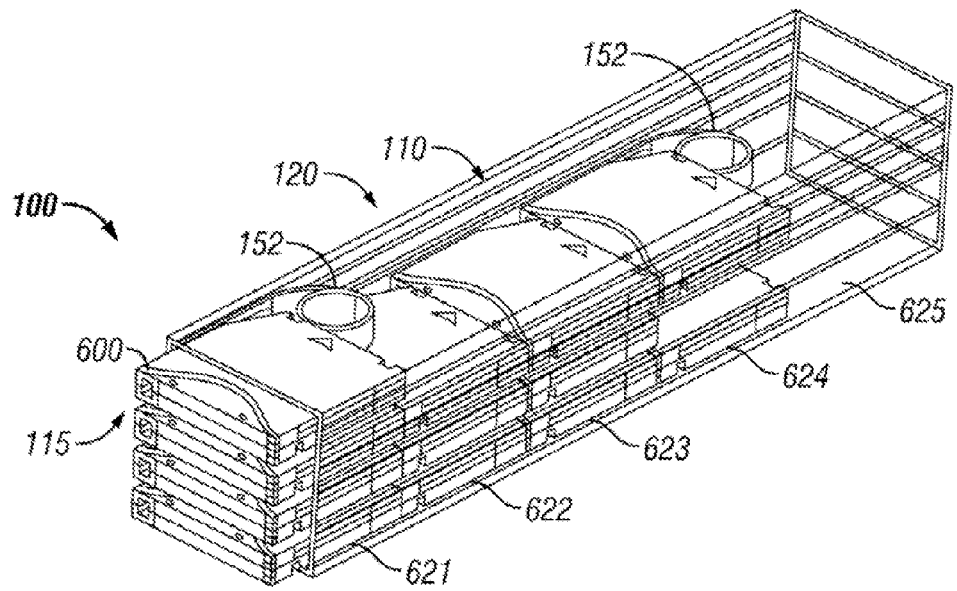
FIGS. 7A-7B are perspective views of a multi-cartridge deep slot cell according to one embodiment.
Figure 7B:
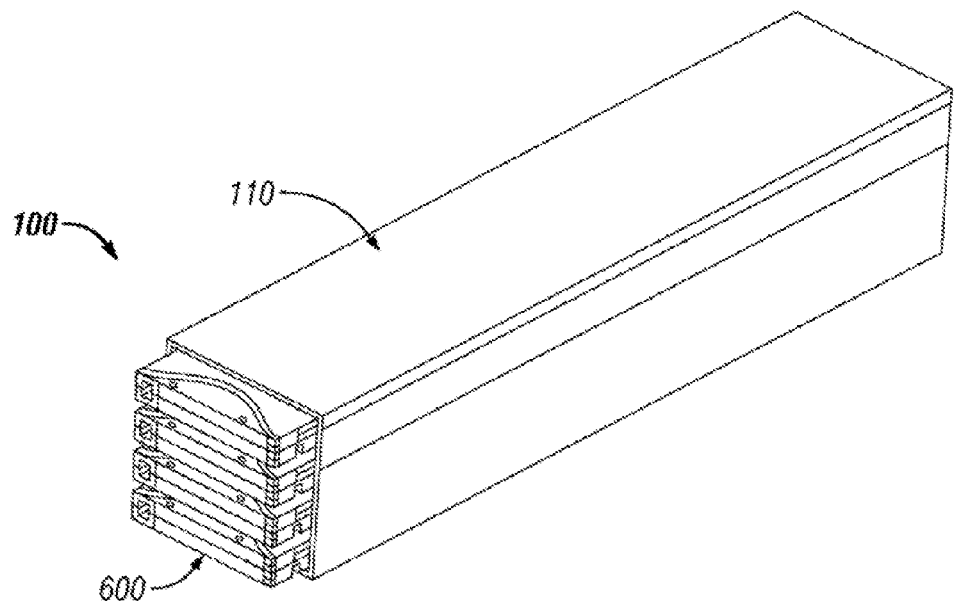

FIGS. 7A-7B depict a multi-cartridge deep slot cell 100, in accordance with one embodiment. As an option, the present deep slot cell 100 may be implemented in conjunction with features from any other embodiment listed herein, such as those described with reference to the other FIGS. Of course, however, such deep slot cell 100 and others presented herein may be used in various applications and/or in permutations which may or may not be specifically described in the illustrative embodiments listed herein. Further, the deep slot cell 100 presented herein may be used in any desired environment. Thus FIGS. 7A-7B (and the other FIGS.) should be deemed to include any and all possible permutations.

Looking now to FIGS. 7A-7B, a multi-cartridge deep slot cell 100 having biasing springs 152 is depicted according to one embodiment. As shown in the illustrative embodiment, the multi-cartridge deep slot cell 100 comprises a housing 110 defining an interior space 115. Furthermore, a plurality of storage slots 120 is disposed within the housing, and may be configured for storing up to a plurality of data storage cartridges 600, depending on the desired approach. Alternatively, the multi-cartridge deep slot cell 100 may be built into the frame of the automated data storage library according to one approach.

FIGS. 8A-8D illustrate an embodiment of a cartridge blocking mechanism 150 having a retaining gate 660 that retains the data storage cartridges in the multi-cartridge deep slot cell 100 according to one embodiment. As illustrated, according to one approach, the retaining gate 660 may be externally attached to a multi-cartridge deep slot cell 100, relative to a front opening of the multi-cartridge deep slot cell 100, whereby the retaining gate 660 can be activated by an accessor 18, e.g., of an automated tape library. Moreover, the retaining gate 660 allows for positive cartridge retention against the pressure of biasing springs (see 152 of FIGS. 7A-7B), and ensures that one or more data storage cartridges do not get pushed out of the multi-cartridge deep slot cell 100 simultaneously, while allowing the pushing mechanism (not shown) of the multi-cartridge deep slot cell 100 to continuously push data storage cartridge(s) to the opening in a multi-cartridge deep slot cell 100. Thus, according to one approach, the accessor 18 may open the retaining gate to gain access to the data storage cartridge in tier 1 and, upon its extraction, the biasing spring 152 moves the cartridge(s) positioned behind the extracted cartridge forward, thereby promoting the cartridge(s) by one tier as will soon become apparent.

Figure 8A:
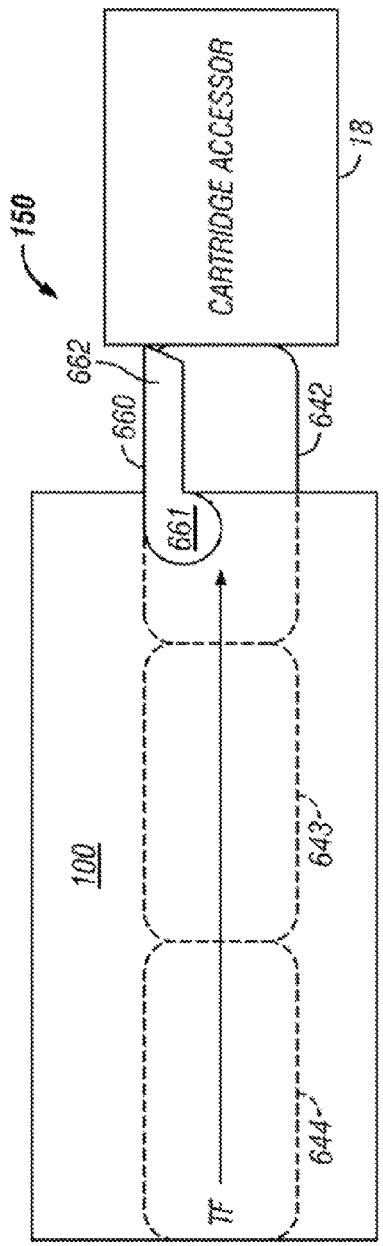
FIGS. 8A-8D are partial side views of a cartridge blocking mechanism according to one embodiment.

The basic working of the retaining gate is that the gate prevents the data storage cartridge(s) from being pushed out of a multi-cartridge deep slot cell 100. For example, as shown in FIGS. 8A-8D, a retaining gate 660 can be lifted by, for example, accessor 18 or by a front storage cartridge 642 for cartridge removal from/insertion into a multi-cartridge deep slot cell 100. Specifically, retaining gate 660 has a pivoting arm 661 mounted on multi-cartridge deep slot cell 100 via a pivoting post (not shown) that can be integral to a construction of multi-cartridge deep slot cell 100. Pivoting arm 661 is located below a catch 662 of retaining gate 660 whereby a thrust force TF through data storage cartridge 644-642 caused by the pushing mechanism (not shown) of multi-cartridge deep slot cell 100 causes retaining gate 660 to stay closed in a retaining position as shown in FIG. 8A. Moreover, the retaining gate 660 is preferably biased such that it closes in the downward direction over the front opening of multi-cartridge deep slot cell 100. This constant biasing may be achieved via gravity as shown in FIG. 8A or by implementing a spring force, e.g., attached to retaining gate 660 (not shown).

Figure 8B:
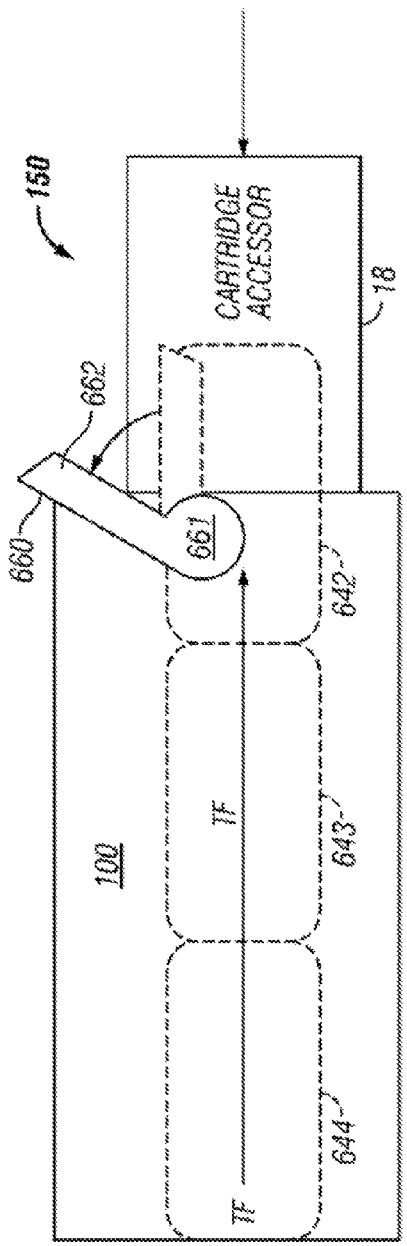
Figure 8C:
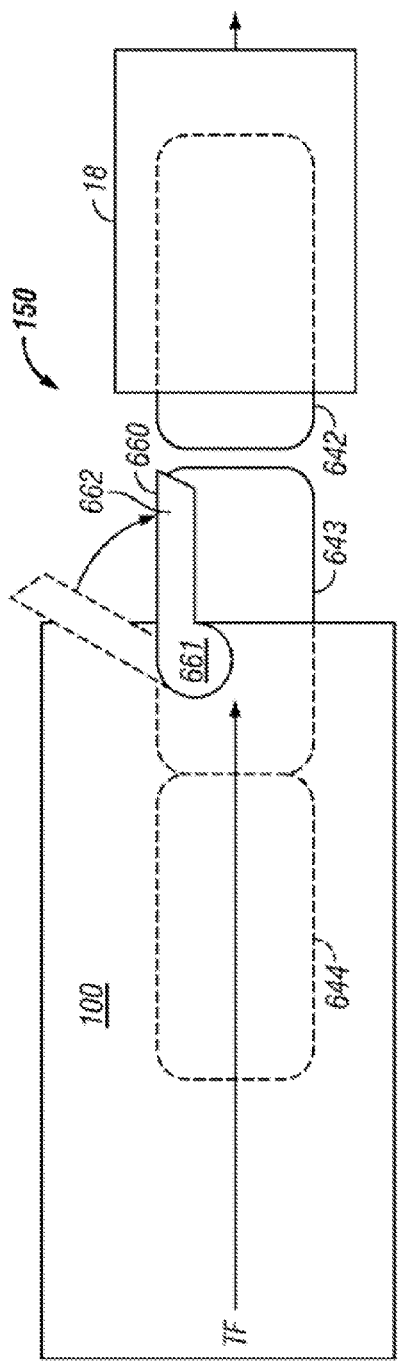

For removal of front storage cartridge 642 by accessor 18 from multi-cartridge deep slot cell 100, retaining gate 660 must be lifted upward to a releasing position whereby catch 662 of retaining gate 660 is disengaged from front storage cartridge 642. This can be seen in FIG. 8B where accessor 18 interfaces with retaining gate 660 by providing a lifting force. Once retaining gate 660 is lifted to the releasing position and accessor 18 is engaged with storage cartridge 642, accessor 18 can pull storage cartridge 642 out of multi-cartridge deep slot cell 100 and into accessor 18 without any interference of retaining gate 660 as shown in FIG. 8C. In view of storage cartridges 644 and 643 being stored in multi-cartridge deep slot cell 100, retaining gate 660 must return to its retaining position to prevent storage cartridges 644 and 643 from being ejected from multi-cartridge deep slot cell 100 by the thrust force TF of the pushing mechanism (not shown). During extraction of front storage cartridge 642 through the front opening of multi-cartridge deep slot cell 100, the retaining gate 660, which is being biased downward, moves back to the retaining position to engage storage cartridge 643.

Figure 8D:
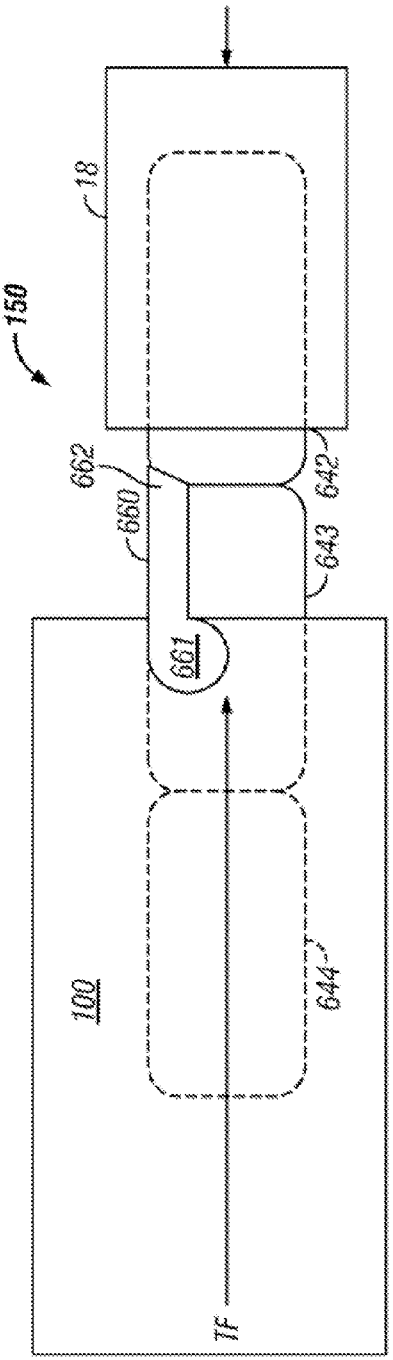

Once front tape cartridge 642 is extracted and storage cartridges 643 and 644 are retained from being pushed out of multi-cartridge deep slot cell 100, retaining gate 660 has successfully completed its cartridge retrieval process. Now retaining gate 660 demonstrates its ability to work for cartridge insertion into multi-cartridge deep slot cell 100. When accessor 18 begins to insert storage cartridge 642 back into multi-cartridge deep slot cell 100, retaining gate 660 is lifted to its releasing position to allow storage cartridge 642 through the front opening of multi-cartridge deep slot cell 100. Catch 662 of retaining gate 660 interfaces with a rear portion of storage cartridge 642, in particular a beveled surface of catch 662 as shown in FIG. 8D, whereby retaining gate 660 is lifted to its releasing position as shown in FIG. 8B due to storage cartridge 642 being pushed in multi-cartridge deep slot cell 100 by accessor 18. In doing so, storage cartridges 644, 643 are pushed deeper into multi-cartridge deep slot cell 100 by storage cartridge 642 in multi-cartridge deep slot cell 100 by accessor 18. Thus, the accessor is able to provide a force greater than the thrust force TF antiparallel thereto, to overcome the directional biasing of the storage cartridges 644, 643. Upon full insertion into multi-cartridge deep slot cell 100, retaining gate 660 moves to its retaining position to engage storage cartridge 642 as shown in FIG. 8A.

For a fuller understanding of the retaining gate, refer to U.S. patent application Ser. No. 11/674,904, which is entitled "Retaining Gate for Deep Storage Slot Retention of Storage Cartridges", which is incorporated herein for reference.

Thus, looking to the embodiments presented herein, access to a storage slot may include the ability to remove a cartridge from a storage slot, the ability to place a cartridge into a storage slot, or combinations thereof.

According to an exemplar) embodiment, the storage slots from top to bottom are considered to be in parallel and comprise the same tier. Moreover, the storage slots from front to back, in a particular row, are considered to be in series and comprise sequential tiers.

Referring back to FIGS. 7A-7B, in accordance with one embodiment, storage slots 120 are depicted as being configured for storing up to a plurality of data storage cartridges 600, and arranged in sequential order of tiers 621, 622, 623, 624, 625 from front to rear. It should be noted that the frontmost tier 621 is also called "tier 1", while the next tier 622 is called "tier 2", etc., and the last tier 625 is also called the "rearmost" tier. However, referring to FIG. 2, in one embodiment, the single cartridge storage slots 16 are also termed "tier 0".

Referring again to FIGS. 1-3, according to one embodiment, the controller of automated data storage library 10 may operate the accessor(s) 18, 28 to selectively extract, place and/or transport data storage cartridges with respect to the multi-cartridge deep slot cells 100 and/or other elements of the automated data storage library 10. For example, the controller may facilitate extracting a cartridge from a multi-cartridge deep slot cell 100, transporting the cartridge to a data storage drive 15 and placing the cartridge in the drive 15. The controller may then extract the cartridge from the data storage drive 15, while directing the accessor to transport the cartridge to a specific multi-cartridge deep slot cell 100, and place the cartridge therein.

In one embodiment, one or more data storage cartridges may be added into the library, e.g., at an I/O station 24, 25, whereby the controller of the automated data storage library 10 may then operate the accessor(s) 18, 28 to transport the cartridge(s) to specific multi-cartridge deep slot cell(s) 100, and place the cartridge(s) therein. Similarly, the controller may operate the accessor(s) to selectively extract, place and transport data storage cartridges with respect to the single cartridge storage slots 16, and/or transport inserted or added cartridge(s) to specific single cartridge storage slots 16.

Moreover, explanation of method 750 is done with continued reference to the storage frame 11 of FIG. 2.

Figure 9:
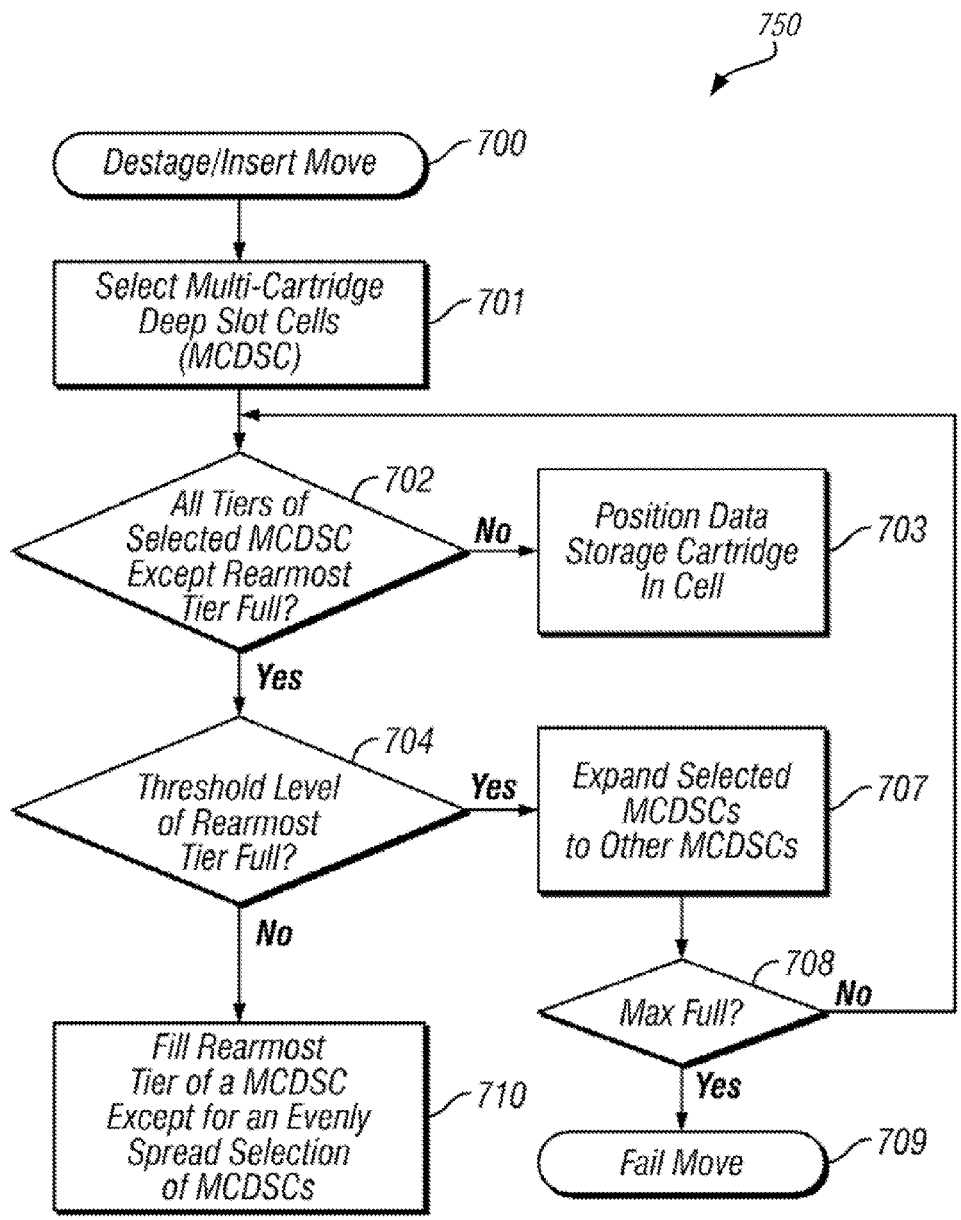
FIG. 9 is a flowchart for a method according to one embodiment.

Referring now to FIG. 9, method 750 illustrates an embodiment of a method of storing data storage cartridges by an automated data storage library. The method 750 may be used to selectively extract, place and transport data storage cartridges with respect to multi-cartridge deep slot cells, where cartridges are placed in tier 1 (the frontmost tier) of a multi-cartridge deep slot cell, moving or demoting any other cartridges in the multi-cartridge deep slot cell by one tier.

The method 750 includes performing destage and/or insert moves. See step 700. According to a preferred approach, insert moves comprise adding new cartridges to the library. Moreover, according to other approaches, destage moves may result from demount moves, e.g., demounting cartridges from data storage drive(s) 15. In method 750, the library controller operates the accessor(s) to selectively extract a specific cartridge from one location, and transport the data storage cartridge with respect to other elements of the automated data storage library.

When the operation(s) at the data storage drive are complete, the controller operates the accessor(s) to return the cartridge to a storage slot 16 or to a multi-cartridge deep slot cell 100. However, if all of the single cartridge storage slots 16 are full, at least in the particular frame of the library of the data storage drive 15 from which the data storage cartridge was previously demounted, the controller may swap the data storage cartridge with a data storage cartridge in another storage slot. Furthermore, the swapped data storage cartridge may then be demoted to tier 1 of a multi-cartridge deep slot cell 100, in an action called "destage", and the demounted cartridge is moved to the storage slot vacated by the demoted cartridge.

As an example, which is in no way intended to limit the invention, all of the single cartridge storage slots may be full because the cartridges mounted in the data storage drives are all from the multi-cartridge deep slot cells. Moreover, according to another approach, the movement of the data storage cartridges may be conducted while maintaining the rearmost tier of the multi-cartridge deep slot cells vacant, called "depth spreading".

Referring again to FIG. 9, step 701 comprises selecting the multi-cartridge deep slot cells (MCDSC) from which to make the choice of loading for a destage or insert move, depending on step 700. One choice may include a single column of multi-cartridge deep slot cells closest to the source of the move, which may limit the potential lateral movement of the accessor. However, an expanded choice may be a section of the library encompassing more than one column. Another choice may be a frame of the library, while a last choice may be the entire library.

In a preferred approach, the library controller maintains an inventory of cartridges and cells, and completes the selection of a multi-cartridge deep slot cell to place the added or inserted cartridge before movement of the accessor.

According to different approaches, at least one, some, a majority, all, etc. of the multi-cartridge deep slot cells in the chosen set may be "selected", while the remainder may be reserved. One example comprises reserving a multi-cartridge deep slot cell to temporarily deposit or store data storage cartridges extracted from the front tiers of another multi-cartridge deep slot cell in order to access and extract a cartridge towards or at the rear of that other multi-cartridge deep slot cell.

With continued reference to FIG. 9, in step 702, the library controller determines whether one or more tiers in addition to the rearmost tier (e.g., 265 of FIG. 7A) is available in any of the selected multi-cartridge deep slot cells, or whether all tiers except the rearmost tier are full.

If at least one tier other than the rearmost tier is available, "NO", in step 703, the library controller operates the accessor(s) to place the next cartridge in one of the selected multi-cartridge deep slot cells, until the stage is reached where each of the frontmost tiers of the selected multi-cartridge deep slot cells become full. According to one approach, the library controller may operate the accessor(s) to place data storage cartridges in the multi-cartridge deep slot cells while maintaining the rearmost tier of the cells vacant. Thus, each of the multi-cartridge deep slot cells may be full except for the rearmost tier of each of the cells.

Referring back to step 702 of FIG. 9, if all of the tiers except the rearmost tier are full, "YES", step 704 determines whether a threshold level of the selected multi-cartridge deep slot cells are full, including the rearmost tier. According to one approach, the threshold may be considered as a determination whether a minimum level of the number of available positions in the rearmost tier of the selected cells has been reached. Moreover, some positions are left available to temporarily deposit or store data storage cartridges extracted from the front tiers of another multi-cartridge deep slot cell in order to access and extract a cartridge towards or at the rear of that other multi-cartridge deep slot cell.

The threshold level may, for example, be that ⅞ of the rearmost tiers of the selected set of multi-cartridge deep slot cells are full and that ⅛ are vacant. In another approach, the threshold may be a specific number of vacancies. The threshold level, in one embodiment, may be predetermined as based on the likely number of cartridges that will be temporarily deposited while accessing a cartridge located in a rearmost tier.

Looking again to step 704, if the threshold level of the selected set of multi-cartridge deep slot cells has been reached, "YES", in step 707, the selection of multi-cartridge deep slot cells is expanded. For example, if the initial selection is a specific column of cells, the selection may be expanded to a number of adjacent columns of cells, to the cells in an entire frame, to the cells of the entire library, etc. Furthermore, if step 708 indicates that the threshold level has been reached for the maximum selection of cells, the destage or insert move is failed in step 709. Otherwise, the process returns to step 702 where the expanded set of multi-cartridge deep slot cells are checked again.

According to one approach, if the library controller has determined that all tiers of the selected multi-cartridge deep slot cells except the rearmost tier are full, e.g., in step 702, another data storage cartridge may be added to the library 10. Moreover, the added data storage cartridge may be demoted to tier 1 in the operations of selectively extracting, placing and transporting data storage cartridges, but is not limited thereto.

With continued reference to the method 750 of FIG. 9, when all tiers except the rearmost tiers are full, and the threshold level of step 704 has not been reached, "NO", in step 710, destaged or inserted data storage cartridges are placed in selected multi-cartridge deep slot cells in tier 1 so as to demote the other cartridges in the cell. As a result, the rearmost tier of the multi-cartridge deep slot cells are filled, except for an evenly spread selection of the multi-cartridge deep slot cells. In one approach, the evenly spread selection may include filling the rearmost tier of multi-cartridge deep slot cells having vacant rearmost tiers based on a random selection. Moreover, as the rearmost tier of one of the multi-cartridge deep slot cells is filled, that cell is removed from the random selection.

However, according to another approach, in response to the determination that all tiers of the selected multi-cartridge deep slot cells 100 except the rearmost tier are full, the library controller may operate the accessor(s) to place data storage cartridges to fill the selected multi-cartridge deep slot cells except for the rearmost tier of every Nth selected multi-cartridge deep slot cell. As one example, "N" may comprise a binary number beginning with "2", or every second cell. The selection of every second cell may begin at any arbitrary cell of the library, and may comprise selecting cells to fill or cells to maintain the rearmost tier vacant.

According to another embodiment, the library controller may employ tie breakers as needed to place the added data storage cartridges in the frontmost tier of the multi-cartridge deep slot cell 100 having the every second, fourth, etc. cell that has the rearmost tier available. According to different approaches, the tie breaker may select the specific cell based on its having the least recently used data storage cartridge in the frontmost tier and/or is at the closest proximity to the source of the move, but is not limited thereto.

Thus, according to one approach, the method 750 of FIG. 9 may continue in binary fashion, filling and leaving vacant the rearmost tier every eighth multi-cartridge deep slot cell 100, etc., and may ultimately fill the rearmost tier of all multi-cartridge deep slot cells, or reach the defined threshold of multi-cartridge deep slot cells set by the library controller.

The "depth spreading" discussed above provides an evenly spread availability of at least the rearmost tier of a number of multi-cartridge deep slot cells, for example, through random selection, or by leaving the rearmost tier of every Nth one of the multi-cartridge deep slot cells vacant. This vacant tier of a number of multi-cartridge deep slot cells, in one embodiment, provides vacant tiers in which to temporarily store or deposit the overlying data storage cartridges to gain access to the target data storage cartridge. Also, or alternatively, certain of the multi-cartridge deep slot cells or certain tiers may be reserved for the purpose of temporarily depositing data storage cartridges overlying a target cartridge.

It will be clear that the various features of the foregoing systems and/or methodologies may be combined in any way, creating a plurality of combinations from the descriptions presented above.

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as "logic," a "circuit," "module," or "system." Furthermore, aspects of the present invention may take the form of a computer program product embodied in one or more computer readable medium(s) having computer readable program code embodied thereon.

According to an exemplary embodiment, a method may include determining an optimal position of a robotic accessor relative to a plurality of storage slots, e.g., according to any of the approaches described and/or suggested herein. However, in a preferred approach, determining an optimal position may be based on calculating a center of access using data corresponding to a physical distribution of media in the storage slots. The method may additionally include positioning a robotic accessor at a computed optimal position during an idle period of the robotic accessor, e.g., according to any of the approaches described and/or suggested herein.

Any combination of one or more computer readable medium(s) may be utilized. The computer readable medium may be a computer readable signal medium or a non-transitory computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the non-transitory computer readable storage medium include the following: a portable computer diskette, a hard disk, a random access memory (RAM), a read-only memory (ROM), an erasable programmable read-only memory (EPROM or Flash memory), a portable compact disc read-only memory (e.g., CD-ROM), a Blu-ray disc read-only memory (BD-ROM), an optical storage device, a magnetic storage device, or any suitable combination of the foregoing. In the context of this document, a non-transitory computer readable storage medium may be any tangible medium that is capable of containing, or storing a program or application for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a non-transitory computer readable storage medium and that can communicate, propagate, or transport a program for use by or in connection with an instruction execution system, apparatus, or device, such as an electrical connection having one or more wires, an optical fibre, etc.

Program code embodied on a computer readable medium may be transmitted using any appropriate medium, including but not limited to wireless, wireline, optical fibre cable, RF, etc., or any suitable combination of the foregoing.

Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer, for example through the Internet using an Internet Service Provider (ISP).

Aspects of the present invention are described herein with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart(s) and/or block diagram block or blocks.

A data processing system suitable for storing and/or executing program code may include at least one processor (which may be or be part of a controller) coupled directly or indirectly to memory elements through a system bus, such as processor 400 of FIG. 4. The memory elements can include local memory employed during actual execution of the program code, such as nonvolatile memory 404 of FIG. 4, bulk storage, and cache memories which provide temporary storage of at least some program code in order to reduce the number of times code must be retrieved from bulk storage during execution.

It will be further appreciated that embodiments of the present invention may be provided in the form of a service deployed on behalf of a customer. Those of skill in the art will understand that changes may be made with respect to the methods discussed above, including changes to the ordering of the choices of the methods of FIG. 9. Further, those of skill in the art will understand that differing specific component arrangements may be employed than those illustrated herein.

While various embodiments have been described above, it should be understood that they have been presented by way of example only, and not limitation. Thus, the breadth and scope of an embodiment of the present invention should not be limited by any of the above-described exemplary embodiments, but should be defined only in accordance with the following claims and their equivalents.

What is claimed is:

1. A system, comprising:
 a robotic accessor for transporting media between multiple storage slots and one or more data storage drives;
 a controller for controlling the robotic accessor;
 a memory in communication with and/or integrated with the controller for storing information about the media and the storage slots, the information including data corresponding to a physical distribution of the media in the storage slots; and
 logic integrated with and/or executable by the controller, the logic being adapted to:
 position the robotic accessor at a computed optimal position during an idle period of the robotic accessor, the computed optimal position being based at least in part on the physical distribution of the media in the storage slots.

2. A system as recited in claim 1, wherein the computed optimal position is determined based on calculating a center of access using at least the data or other data corresponding to the physical distribution of the media in the storage slots.

3. A system as recited in claim 2, wherein the computed optimal position is further determined based on numbers of accesses of the media.

4. A system as recited in claim 3, wherein the computed optimal position is further determined based on times of access of the media, wherein the computed optimal position reduces the average time for the robotic accessor to retrieve a set of arbitrary media stored in arbitrary ones of the storage slots.

5. A system as recited in claim 2, wherein the computed optimal position is further determined based on times of access of the media.

6. A system as recited in claim 2, wherein at least some of the storage slots are capable of storing more than one of the media, wherein the data corresponding to the physical distribution of the media in the storage slots capable of storing more than one of the media includes a tiering value indicative of a position of each medium in the storage slot associated therewith.

7. A system as recited in claim 1, wherein the media includes tape media in tape cartridges.

8. A method, comprising:
positioning a robotic accessor at a computed optimal position during an idle period of the robotic accessor,
wherein the robotic accessor is configured to transport media between multiple storage slots and one or more data storage drives,
wherein the computed optimal position reduces the average time for the robotic accessor to retrieve an arbitrary set of media stored in arbitrary ones of the storage slots.

9. A method as recited in claim 8, wherein the computed optimal position is determined based on calculating a center of access using data corresponding to a physical distribution of the media in the storage slots.

10. A method as recited in claim 9, wherein the computed optimal position is further determined based on numbers of accesses of the media.

11. A method as recited in claim 10, wherein the computed optimal position is further determined based on times of access of the media.

12. A method as recited in claim 9, wherein the computed optimal position is further determined based on times of access of the media.

13. A method as recited in claim 9, wherein at least some of the storage slots are capable of storing more than one of the media, wherein the data corresponding to the physical distribution of the media in the storage slots capable of storing more than one of the media includes a tiering value indicative of a position of each medium in the slot associated therewith.

14. A method as recited in claim 8, wherein the media includes tape media in tape cartridges.

15. A computer program product, the computer program product comprising a non-transitory computer readable storage medium having program code embodied therewith, the program code readable/executable by a controller to:
perform, using the controller, the method of claim 8.

16. A method, comprising:
determining an optimal position of a robotic accessor relative to a plurality of storage slots based on calculating a center of access using data corresponding to a physical distribution of media in the storage slots,
wherein the storage slots are for storing the media therein,
wherein the robotic accessor is adapted for transporting the media between the storage slots and one or more data storage drives.

17. A method as recited in claim 16, comprising moving the robotic accessor to the determined optimal position.

18. A method as recited in claim 16, wherein the optimal position is further determined based on at least one of times of access of the media and numbers of accesses of the media.

19. A method as recited in claim 16, wherein at least some of the storage slots are capable of storing more than one of the media, wherein the data corresponding to the physical distribution of the media in the storage slots capable of storing more than one of the media includes a tiering value indicative of a position of each medium in the slot associated therewith.

20. A computer program product, the computer program product comprising a non-transitory computer readable storage medium having program code embodied therewith, the program code readable/executable by a controller to:
perform, using the controller, the method of claim 16.

* * * * *